US012448938B2

(12) United States Patent
Marchionda

(10) Patent No.: US 12,448,938 B2
(45) Date of Patent: Oct. 21, 2025

(54) INTERNAL COMBUSTION ENGINE MONITORING SYSTEM

(71) Applicant: Caterpillar Inc., Peoria, IL (US)

(72) Inventor: Michael S. Marchionda, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 299 days.

(21) Appl. No.: 18/215,589

(22) Filed: Jun. 28, 2023

(65) Prior Publication Data
US 2025/0003376 A1 Jan. 2, 2025

(51) Int. Cl.
F02M 35/09 (2006.01)
B01D 35/143 (2006.01)
B01D 46/00 (2022.01)
F02M 35/10 (2006.01)
F02M 35/16 (2006.01)

(52) U.S. Cl.
CPC ......... *F02M 35/09* (2013.01); *B01D 46/0086* (2013.01); *F02M 35/1038* (2013.01); *B01D 35/1435* (2013.01); *B01D 2279/60* (2013.01); *F02M 35/164* (2013.01)

(58) Field of Classification Search
CPC .. F02M 35/09; F02M 35/1038; F02M 35/164; B01D 46/0086; B01D 35/1435; B01D 2279/60
See application file for complete search history.

(56) References Cited

U.S. PATENT DOCUMENTS

| 5,205,261 | A | 4/1993 | Betts, Jr. et al. |
| 5,477,731 | A | 12/1995 | Mouton |
| 5,681,988 | A | 10/1997 | Koch et al. |
| 6,172,602 | B1 * | 1/2001 | Hasfjord ................ G07C 5/085 |
| | | | 701/29.5 |
| 7,178,410 | B2 | 2/2007 | Fraden et al. |
| 9,983,114 | B2 | 5/2018 | Henderson et al. |
| 2016/0116392 | A1 | 4/2016 | Carpenter et al. |
| 2016/0208726 | A1 | 7/2016 | Tanaka et al. |
| 2017/0067814 | A1 * | 3/2017 | Steinert ............. G01N 15/0826 |
| 2019/0176075 | A1 * | 6/2019 | Hoff ....................... F02M 35/09 |

FOREIGN PATENT DOCUMENTS

| CA | 3081862 A1 * | 1/2021 | ............. B64D 45/00 |
| DE | 102004038106 | 2/2005 | |
| FR | 2980522 | 3/2013 | |

OTHER PUBLICATIONS

CA-3081862-A1, English Translation (Year: 2021).*

* cited by examiner

Primary Examiner — Ryan D Walsh
(74) Attorney, Agent, or Firm — Schwegman, Lundberg & Woessner

(57) ABSTRACT

An internal combustion engine monitoring system can include a fluid filter disposed between at least one fluid inlet of the internal combustion engine and at least one of a fluid source or an ambient fluid environment. At least one fluid sensor arranged can be arranged to detect a plurality of indications of respective fluid pressures on first and second sides of the fluid filter at a plurality of corresponding engine operating conditions. The indications can be compared with their corresponding operating conditions to assess a condition of the fluid filter and estimate a lifetime thereof.

20 Claims, 7 Drawing Sheets

INTERNAL COMBUSTION ENGINE MONITORING SYSTEM

TECHNICAL FIELD

The present disclosure relates to internal combustion engines such as those for vehicles or stationary power generation. More particularly, the present disclosure relates to internal combustion engines for use with work machines such as excavators, tracked drills, crawlers, cold planers, paving machines, graders, compaction machines, tractors, or the like as well as with stationary power generation systems or "gensets." Internal combustion engines can include fluid filters to prevent contaminants from entering the engine.

BACKGROUND

Power for machinery, e.g., agricultural, industrial, construction, or other heavy machinery, and generators can be generated by an internal combustion engine. Internal combustion engines combust a mixture of air and fuel in cylinders and thereby produce drive torque and power. Generally, an internal combustion engine can include an air intake system that allows a certain volume of air into the engine cylinders. A fuel system can then supply a specified portion of fuel to the cylinders, which upon combustion yields drive torque and power. A control system can be used to adjust the air-fuel mixture to help promote a desired combustion. Internal combustion engines can include fluid filters to prevent contaminants from entering the engine. Such fluid filters generally need to be replaced to maintain desired engine functionality and to protect other parts of the engine from becoming damaged.

SUMMARY

This document describes an internal combustion engine monitoring system. The system can monitor operating conditions of the engine to help predict a lifetime or expected plugging event of a fluid filter, e.g., an air or fuel filter. For example, the system can include or use at least one fluid filter disposed between at least one fluid inlet of the internal combustion engine and at least one of a fluid source or an ambient fluid environment. The system can include a first fluid sensor arranged to receive a first indication of respective fluid pressures on first and second sides of the fluid filter at a first engine operating condition. For example, the first and second indications of respective fluid pressures each include a plurality of respective fluid pressure measurements on the first and second sides of the fluid filters over time.

In an example, the system can include a second fluid sensor arranged to receive a second indication of the respective fluid pressures on the first and second sides of the fluid filter at a second engine operating condition. The system can include processing circuitry to receive sensor data from the first and second fluid sensors. The processing circuitry can determine a pressure differential over time across first and second sides of the fluid filter to estimate fluid flow across the fluid filter. The processing circuitry can also adjust at least one parameter of the received first and second indications of respective fluid pressures to mitigate a difference attributable to a difference between the first and second engine operating conditions. The processing circuitry can then compare the adjusted first respective indications of the fluid pressures with the adjusted second respective indications of the fluid pressures. For example, the processing circuitry can estimate a period of time when the fluid pressure differential will exceed a threshold value.

The system can include a user interface to display an alert indicating a condition of the engine fluid filter based on the monitored pressure differential, the alert triggered by the processing circuitry based on the determined pressure differential exceeding a specified threshold differential. For example, the user interface can be included such as to display the alert including an indication to replace or clean the fluid filter in anticipation of a plugging event of the fluid filter.

In an example, the first and second engine operating conditions can respectively include first and second engine boost pressures. For example, the first engine boost pressure can be within a range of 0 kilopascals (kPa) and 50 kPa and the second engine boost pressure can be greater than 100 kPa. In an example, the processing circuitry trigger the alert, including generating an indication to replace or clean the fluid filter based on a differential slope exceeding a specified threshold value.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
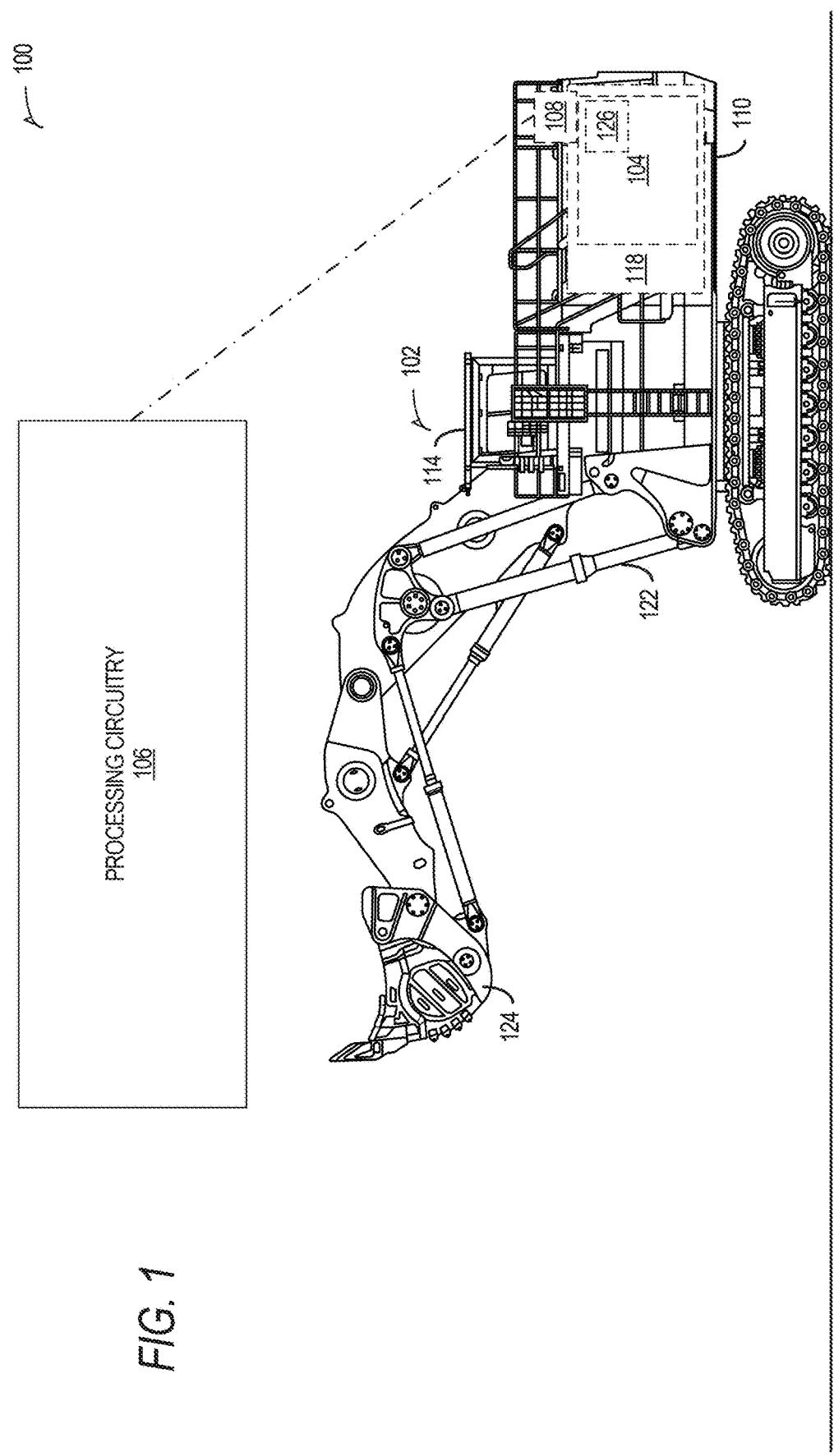
FIG. 1 depicts a work machine connected to an internal combustion engine monitoring system, according to one or more examples.
Figure 2:
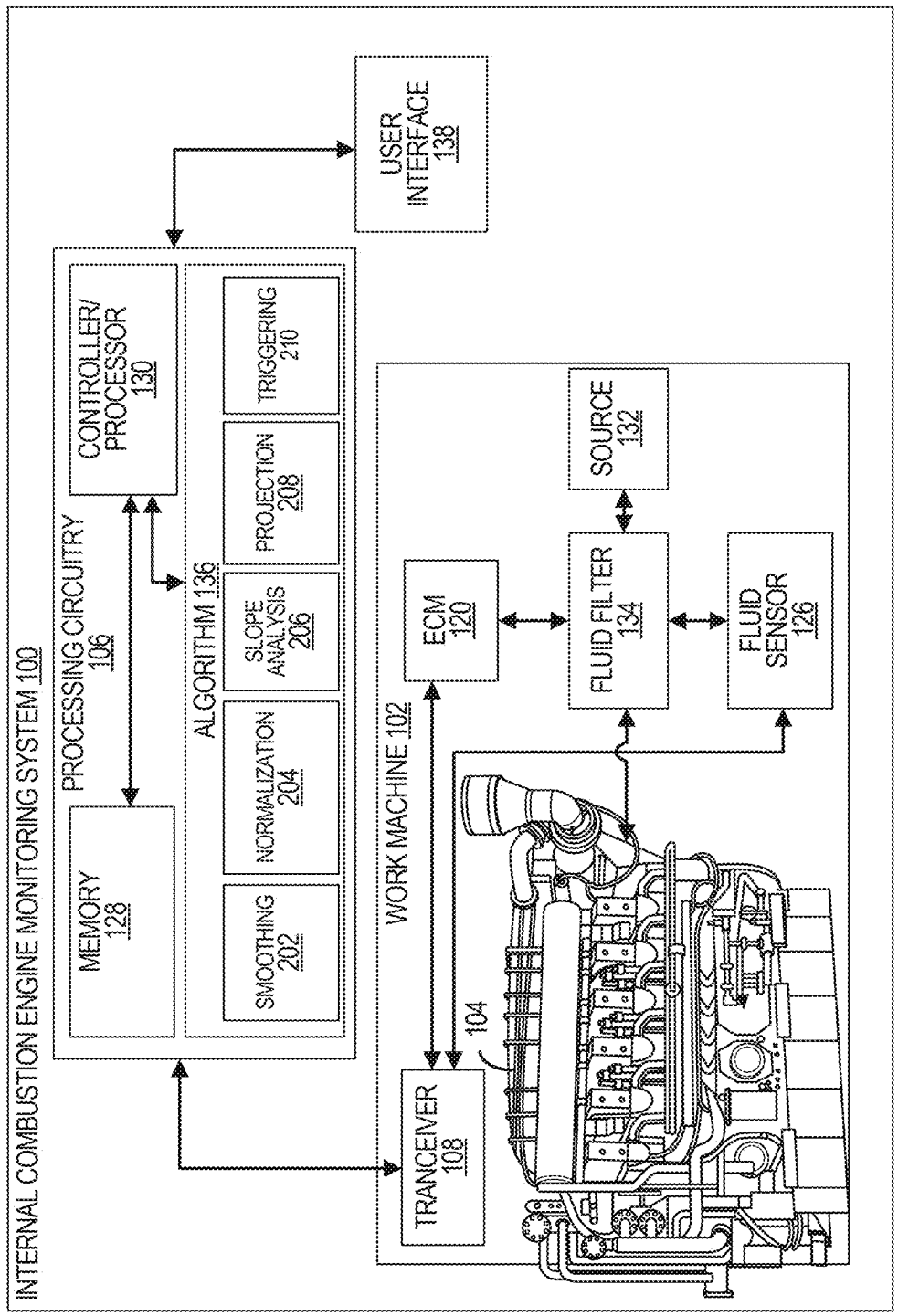
FIG. 2 is a block diagram of an example of an internal combustion engine monitoring system for running an algorithm to estimate a condition or forecast a replacement date of a fluid filter.

FIG. 1 depicts a work machine connected to an internal combustion engine monitoring system, according to one or more examples. The monitoring system 100 can include or be communicatively coupled to one or more internal combustion engines 104, e.g., included in at least one work machine 102 (as shown in FIG. 2). The internal combustion engine 104 can be used for power generation such as for the propulsion of vehicles or other machinery and/or for powering auxiliary equipment of the work machine such as hydraulic systems and the like. For example, the internal combustion engine 104 can include one of several piston-cylinder arrangements and configurations including, e.g., V-engines, inline engines, and horizontally opposed engines, as well as overhead cam and cam-in-block configurations. In an example, the internal combustion engine 104 can be used in stationary applications as well as with vehicles and/or machinery that include those related to various industries, including, as examples, power generation (e.g., a generator), oil exploration, construction, agriculture, forestry, transportation, material handling, waste management, etc.

As depicted in FIG. 1, the monitoring system 100 can include or be communicatively coupled to one or more work machines, e.g., an excavator 102. Examples of work machines 102 for use with the monitoring system 100 can include excavators, tractors, dozers, haulers, packers, pavers, mixer trucks, asphalt distributor trucks, off-highway trucks, wheel loaders, segregators, compactors or rollers, soil stabilizers, generators, etc.

The monitoring system 100 can also include processing circuitry 106 for receiving data from the one or more internal combustion engines. For example, an individual work machine 102 can include a transceiver 108 communicatively coupled to one or more sensors of an internal combustion engine 104 for communicating the data to remotely located processing circuitry 106. In another example, the processing circuitry 106 can be located onboard the individual work machine 102.

In an example, the work machine 102 can include a frame 110. The frame 110 can be supported on a plurality of wheels 112, and the wheels 112 can enable the work machine 102 to move across the surface of a terrain or operate in an environment. The work machine 102 can also include a control cabin 114 or operator station, which can be located on the frame 110 for housing a transport or propulsion system 118. The transport or propulsion system 118 can be configured to move the work machine 102 across the surface of the terrain or in the environment. The propulsion system 118 can include an internal combustion engine 104, which can include one or more filters, e.g., fuel filters, air filters, or oil filters that are coupled to the internal combustion engine. The combustion engine may have a power takeoff component for powering other auxiliary systems on the work machine such as, for example, a hydraulic system, that may be operably coupled to one or more implements or other systems. In an example, the work machine 102 can include at least one power take-off (PTO) for powering a hydraulic system or other auxiliary energy sink, e.g., a motor or generator. The PTO can be mechanically coupled to, and operatively engaged with, the internal combustion engine 104 of the work machine 102. When the PTO is engaged and powered by the internal combustion engine 104, the PTO can be used to transfer energy (e.g., in the form of torque) from the internal combustion engine 104 to, for example, a hydraulic system and/or the ground engaging system 120. For example, the PTO can be used to power a hydraulic system, and the hydraulic system can be used to operate and implement attached thereto.

The work machine can include a ground engaging propulsion system 120. The ground engaging propulsion system 120 can be associated with the frame 110 and the wheels 112 and configured to interact with the terrain or environment wherein the work machine 102 is operating. For example, the ground engaging ETC system 120 can include tires, tread, and tracks to interact with a surface. The ground engaging system 120 can be arranged to affect a motion capability of the work machine 102, for example, the ground engaging system 120 can be configured to provide traction, braking, and steering functions.

In an example, the work machine 102 can include a hydraulic system 122. The hydraulic system 122 can be powered by the internal combustion engine 104 of the work machine 102 and used to actuate any number of hydraulic implements, such as hydraulic actuators and hydraulic attachments. The hydraulic system 122 can be mechanically coupled to, and operatively engaged with, the internal combustion engine 104, e.g., via a PTO. The hydraulic system 122 can have a source of hydraulic fluid, driven by a hydraulic pump powered by the PTO or otherwise powered by the internal combustion engine 104. The hydraulic system 122 can include one or more fluid filters for filtering or removing contaminants from the hydraulic fluid. The hydraulic system 122 can also include a hydraulic reservoir for storing the hydraulic fluid.

In an example, the work machine 102 can include at least one work implement 124. The work implement 124 can be mechanically coupled and operatively engaged with the frame 110 of the work machine 102, e.g., near the control cabin 114 or the operator station. The work implement 124 can include, for example, an attachment, tool, or task-specific implement. For example, the work implement 124 can include an attachment such as a paver, a saw, a drill, a boom, a mower, a trencher, or the like, which is used to perform specific tasks associated with the work machine 102. The work implement 124 can also include any attachments or tools that can be used for building or construction applications, such as reactive force compaction, vibratory compaction, compaction wheels, or the like. The work implement 124 can also include various yard and/or agriculture applications, such as rakes, tillage components, planters, sod cutters, harvesters, brush mowers, or the like.

FIG. 2 is a block diagram of an example of an internal combustion engine monitoring system for running an algorithm to estimate a condition or forecast a replacement date of a fluid filter. In an example, the internal combustion engine 104 can be communicatively coupled with an equipment controller module (ECM) 120, which can be communicatively coupled to the internal combustion engine 104 and configured to receive data from at least one of the work machine 102 or the internal combustion engine 104 for controlling the operation of the internal combustion engine 104. The ECM 120 can also be communicatively coupled to a user interface located within the control cabin 114, e.g., to issue onboard diagnostic codes, e.g., related to the filters of the internal combustion engine 104. The ECM 120 can be connected to the systems and components of the work machine 102 and be responsible for certain operations of the work machine, e.g., power management, diagnostics, implement control, driving or other machine movement, etc. The ECM 120 can be configured to store the onboard diagnostic code data, and the data can be communicated from the ECM 120 and received by the processing circuitry 106 of the monitoring system 100. Additionally, the ECM 120 can be communicatively coupled to one or more sensors (e.g., fluid sensor 126), in order to receive sensor data related to the work machine 102 or the internal combustion engine 104. The ECM 120 can be communicatively coupled to transceiver circuitry, e.g., the transceiver 108, to receive remote data for generating a remote diagnostic code or to assist with generating the onboard diagnostic code.

The transceiver 108 can be configured to communicate with the processing circuitry 106. The transceiver 108 can include a long-range wireless transceiver, such as a cellular, satellite, or Wi-Fi transceiver, and can receive data from devices communicatively coupled with the transceiver 108 by, e.g., a cellular network, satellite network, or Wi-Fi network. The transceiver 108 can also include a short-range wireless transceiver, such as a Bluetooth transceiver, which can be used to communicate with the other systems and components of the work machine 102 and/or with external off-board transmissions. In an example, the processing circuitry 106 can be remotely located from the work machine 102, and configured to serve as a gateway for data transfer, via the transceiver 108 communicating through a network. The network can be a local area network, such as a cellular network, or a global communications network, such as the Internet. The network can communicatively couple the processing circuitry 106 with a remote/centralized server, e.g., operated by a manufacturing entity, a dealer, service technicians, etc. responsible for the work machine 102. The server can include one or more databases, which can store updated machine/component information, diagnostic information, replacement part information, analytical information, and machine/component operational data, etc.

Generally, the internal combustion engine 104 can receive fluid from a source 132 (e.g., an ambient environment, a reservoir, a fuel tank, etc.) at a fluid inlet (e.g., an air inlet, an oil inlet, a fuel inlet, etc.). The fluid can be filtered and/or otherwise conditioned by one or more filtering components (e.g., air filters, oil filters, fuel filters, etc.). From the filtering components, the fluid can flow to the internal combustion engine 104, for combustion, and exhaust emissions can exit via an exhaust port. Thus, the internal combustion engine 104 can be equipped with at least one fluid filter 134, disposed between the fluid inlet of the engine 104 and the source 132, for filtering the fluid from the source 132. The at least one fluid filter 134 can include materials for filtering or removing contaminants, particles, or debris from the fluid. For example, the at least one fluid filter 134 can include a mesh material, porous material, absorbing material, paper, woven material, etc., or combination thereof. In an example, the at least one fluid filter 134 can include a replaceable filter element, which can be replaced by the user, the operator of the work machine 102, or by service personnel.

The monitoring system 100 can include at least one fluid sensor 126, coupled to the internal combustion engine 104. The at least one fluid sensor 126 can be used to detect an indication of a fluid pressure corresponding with the fluid filter 134 at a certain engine operating condition. In an example, the monitoring system 100 can include a plurality of fluid sensors disposed on each side of the fluid filter 134 to collectively detect the indication. The at least one fluid sensor 126 can include, for example, an air filter pressure differential sensor, a fuel filter pressure differential sensor, an engine speed sensor, an engine oil pressure sensor, an engine oil temperature sensor, a fuel pressure sensor, a fuel temperature sensor, an ambient pressure sensor, an ambient temperature sensor, an exhaust gas temperature sensor, or a combination thereof. The at least one fluid sensor 126 can be configured to provide data corresponding to an operating condition of the internal combustion engine 104, and such data can be received by at least one of the processing circuitry 106 and the equipment controller module (ECM) 120, each of which can be communicatively coupled to the at least one fluid sensor 126.

In an example, the processing circuitry 106 can determine a pressure differential over time across first and second sides of the fluid filter 134 to estimate fluid flow across the fluid filter 134. For example, the processing circuitry 106 can include a memory 128 coupled to a processor 130. The memory 128 can store software, which, when executed by the processor 130, can cause the processing circuitry 106 to track operational information related to the internal combustion engine 104, such as boost pressure, fluid flow, engine speed, normal engine combustion, engine temperature, engine vibration, or any other metrics of interest. The processing circuitry 106 can also determine a status of the internal combustion engine 104 related to, for example, the performance of the filter or a wear on the fluid filter 134 based on the data collected from the one or more first fluid sensor 126. The internal combustion engine monitoring system 100 can also include a user interface 138 to display an alert indicating a condition of the fluid filter 134, and the alert can be triggered by the processing circuitry 106 based on a determined pressure differential, or a slope thereof, of the fluid filter 134 exceeding a specified threshold differential. While the algorithm is shown separate from the memory, it is to be understood that the algorithm may include computer-implemented instructions stored in the memory 128 and/or the algorithm may include software, hardware, or a combination of software and hardware configured to perform particular operations.

The data collected from the one or more first fluid sensor 126 can be used by the algorithm 136 to identify or predict flow restriction of the fluid filter 134. Here, the algorithm 136 can be used to forecast a projected replacement date of the fluid filter 134. The algorithm 136 can be executed by the processor 130 of the processing circuitry 106. The algorithm 136 can include a variety of functions and operations, such as a smoothing operation 202, a normalization operation 204, a slope analysis 206, a projection operation 208, and a triggering operation 210. In an example, a "steady state" of a filter can be quantified, e.g., based on an ~10 second moving variance of a normalized engine load (between about 30% load and about 90% load) and engine speed (e.g., greater than about 1000 rpm), based on the following equations:

$$\sqrt{movvar_{speed}^2 + movvar_{load}^2} < thresh,\ thresh = 4e^{-4} \quad (1)$$

$$movvar_{speed} = \mathrm{Var}\left(\frac{speed}{2000}\right),\ movvar_{load} = \mathrm{Var}\left(\frac{load}{100}\right) \quad (2)$$

The smoothing operation 202 can improve results associated with short-term outlier conditions in the raw sensor data, thereby helping to derive more meaningful data related to the condition of a particular filter. The smoothing operation 202 can also reduce the conditioning time for the raw sensor data prior to the slope analysis 206. In an example, the smoothing operation 202 can employ a moving average of the calculated slope over time, e.g., a time-weighted average to weight certain data taken more recently. The smoothing operation 202 can help limit noise in the data as it is processed in downstream steps of the algorithm 136.

In an example, comparing a time-based EWMA (where the moving average "look-back" window is a time interval, e.g. 24 hours) with sample based EWMA (e.g. "look-back" window of 24 samples) can help algorithm performance in cases where data samples are not collected at regular intervals. The main difference between an EWMA and a moving average is that the EWMA may not involve a "true" window size as in the case of the moving average. For example, herein where the EWMA "look-back" window is a set time period (e.g., 24 hours), the algorithm can incorporate data outside the 24 hours in calculating the average. Here, a prescribed window size can be used to decide the weight factor that will be used in the weighted average formula such that a response resembles a simple moving average looking at only the last 24 hours. This can help the algorithm avoid a need to store an arbitrary number of samples that may have been taken in a given 24 period.

The normalization operation 204 can receive the smoothed output of the raw sensor data, thereby normalizing a range of values associated with the sensor data. In an example, the normalization operation 204 can determine a maximum peak value for the smoothed output, which can then be normalized to within a predetermined range (e.g., between an upper limit and a lower limit). The normalized values can then be outputted for use in the slope analysis 206.

The slope analysis 206 can determine a rate of change of a series of consecutive or discretized values (e.g., a first normalized value and a second normalized value) associated with the filtered output of the raw sensor data. In an example, the slope analysis 206 can compare a series of consecutive or discretized values (e.g., a first normalized value and a second normalized value), e.g., within a user-defined "lookback" window, associated with the normalized sensor data. The slope analysis 206 can compare the first normalized value (e.g., a differential pressure) to the second normalized value, and determine whether the difference between the first normalized value and the second normalized value is within a given threshold. If so, then the slope analysis 206 can determine a rate of change associated with the normalized sensor data as being substantially constant, flat, or not increasing. In an example, the slope analysis 206 can involve quantifying restriction measurements based on corresponding measured first and second engine boost pressures. In an example, a first engine boost pressure can be within a range of 0 kilopascals (kPa) and 50 kPa and a second engine boost pressure can be greater than 100 kPa.

For example, where P0=restriction at <20 kPa boost, P1=restriction at >about 120 kilopascals (kPa) of boost pressure, X0=boost measurement for P0, and X1=boost measurement for P1, the slope analysis 206 can be conducted based on the following equation:

$$\frac{\Delta \text{Restriction}}{\Delta \text{Boost}} = \frac{\overline{P1} - \overline{P0}}{\overline{X1} - \overline{X0}} ETC \qquad (3)$$

In an example, a time rate of change (ROC) can be calculated based on the following equation, with a 12 hour EWMA acting as a historical value:

$$\frac{y_1 - y_0}{t_1 - t_0} \approx \frac{EWMA_{T=12} - \text{Current}}{12 - 0} \qquad (4)$$

In another example, the ROC can be calculated based on the following equation, with a 24 hour EWMA acting as a historical value and a 2 hour EWMA acting as a current value:

$$\frac{y_1 - y_0}{t_1 - t_0} \approx \frac{EWMA_{T=24} - EWMA_{T=2}}{24 - 2} \qquad (5)$$

Subsequently, the slope analysis 206 can output a trending indicator indicating the rate of change of the normalized sensor data as being substantially constant. The trending indicator can indicate, for example, that sensor data is indicative of a filter that is not yet ready to be replaced.

Alternatively, if the difference between the first normalized value and the second normalized value is found to be outside of the given threshold, then the slope analysis 206 can determine a rate of change associated with the normalized sensor data as being substantially non-constant. Subsequently, the slope analysis 206 can output a trending indicator (e.g., a status signal) that can indicate, for example, that the sensor data is indicative of a filter that is ready to be replaced.

In an example, the projection operation 208 can include a projection algorithm capable of forecasting or estimating a projected rate of change of the normalized sensor data over a given amount of time. The projection operation 208 can receive the normalized sensor data, and can project the rate of change of the normalized sensor data at a future point relative to a current point of the normalized sensor data and then output a projected change in rate of change. The projection can involve estimating a time until a threshold differential pressure will be reached based on the below equation:

$$\frac{\text{threshold differential pressure} - \text{current differential pressure})}{ROC} \qquad (6)$$

In an example, the threshold differential pressure can be calculated based on the below equation:

$$\text{threshold Differential Pressure} = 0.030 \frac{kPa_{restr}}{kPa_{boost}} \qquad (7)$$

In another example, the threshold differential pressure can be determined within a range of about 90 kPa to about 110 kPa, e.g., about 100 kPa.

The triggering operation 210 can determine when to display an alert or activate other components of the monitoring system 100 based on a determination that the time until the threshold differential pressure will be reached is less than a predetermined period, e.g., less than about 48 hours. If so, the triggering operation 210 can output a data indicating an executable condition to suggest a replacement of the fluid filter 134. In an example, the triggering operation 210 can generate an alert to suggest a replacement before an ECM diagnostic code is activated indicating suggested replacement of the fluid filter 134. In an example, the algorithm 136 can calculate filter replacement intervals in the range of three to four weeks up to six months. In an example, e.g., to verify an accuracy or precision of the algorithm 136, the algorithm 136 can also receive ECM data from the ECM 120 of the work machine 102 and use the ECM data to aid in estimating a condition of the filter 134, e.g., involving using the ECM data as a secondary indicator of condition of the filter 134 or comparing the ECM data with the estimation from the triggering operation 210.

Figure 3:
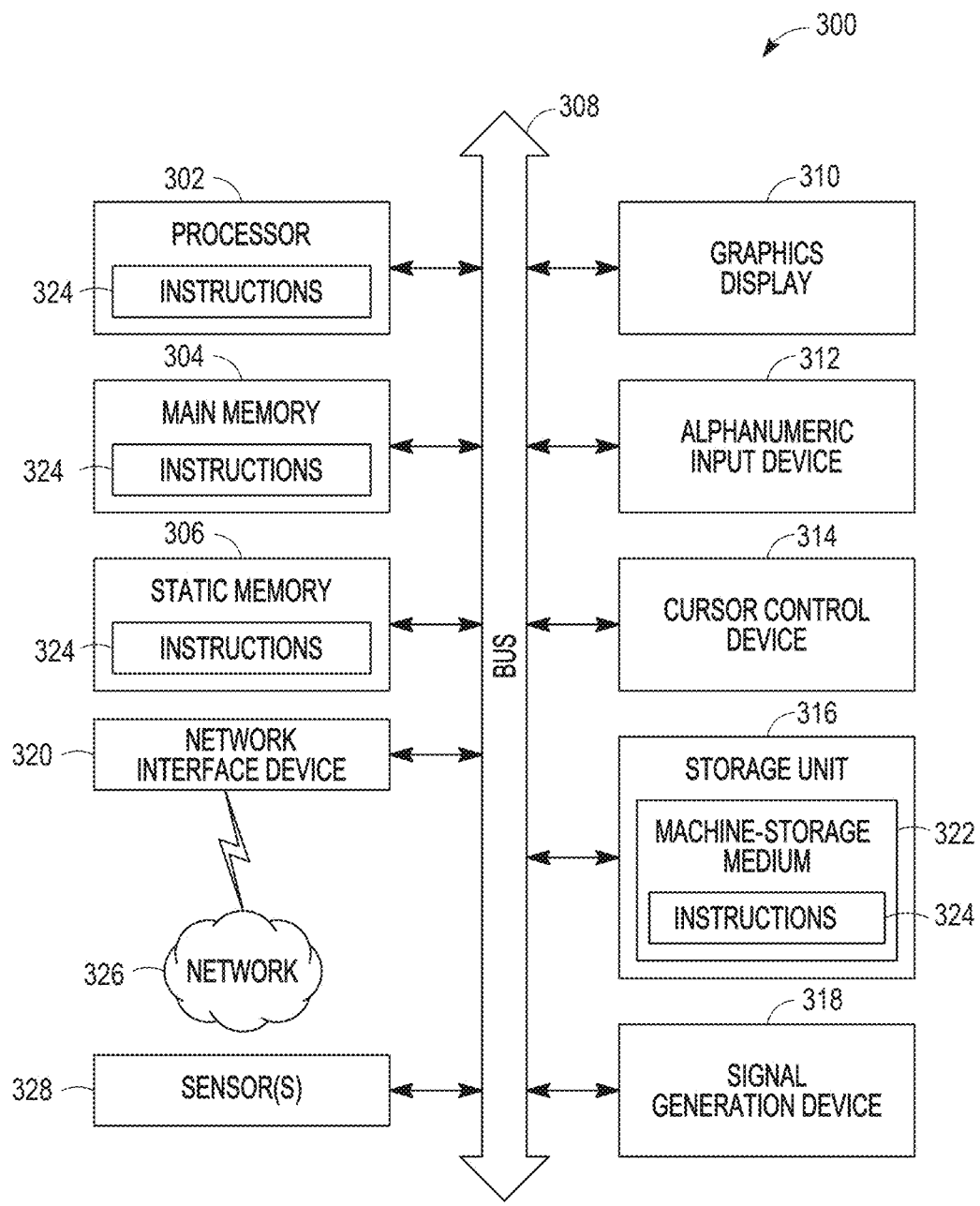
FIG. 3 is a block diagram illustrating components of a computing machine for performing operations to estimate a condition or forecast a replacement of a fluid filter.

FIG. 3 is a block diagram illustrating components of a machine 300, according to some example embodiments, able to read instructions 324 from a machine-storage medium 322 (e.g., a non-transitory machine-storage medium, a machine-storage medium, a computer-storage medium, or any suitable combination thereof) and perform any one or more of the methodologies discussed herein, in whole or in part. Specifically, FIG. 3 shows the machine 300 in the example form of a computer system (e.g., a computer) within which the instructions 324 (e.g., software, a program, an application, an applet, an app, or other executable code)

for causing the machine 300 to perform any one or more of the methodologies discussed herein can be executed, in whole or in part. For example, the instructions 324 can be processor executable instructions that, when executed by a processor of the machine 300 (e.g., included in the processing circuitry 106 of FIG. 1 and FIG. 2), cause the machine 300 to perform the operations outlined above.

In various embodiments, the machine 300 operates as a standalone device or can be communicatively coupled (e.g., networked) to other machines. In a networked deployment, the machine 300 can operate in the capacity of a server machine or a client machine in a server-client network environment, or as a peer machine in a distributed (e.g., peer-to-peer) network environment. The machine 300 can be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 324, sequentially or otherwise, that specify actions to be taken by that machine. Further, while only a single machine is illustrated, the term "machine" shall also be taken to include any collection of machines that individually or jointly execute the instructions 324 to perform all or part of any one or more of the methodologies discussed herein.

The machine 300 includes a processor 302 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 304, and a static memory 306, which are configured to communicate with each other via a bus 308. The processor 302 can contain microcircuits that are configurable, temporarily, or permanently, by some or all of the instructions 324 such that the processor 302 is configurable to perform any one or more of the methodologies described herein, in whole or in part. For example, a set of one or more microcircuits of the processor 302 can be configurable to execute one or more modules (e.g., software modules) described herein.

The machine 300 can further include a graphics display 310 (e.g., a plasma display panel (PDP), a light emitting diode (LED) display, a liquid crystal display (LCD), a projector, a cathode ray tube (CRT), or any other display capable of displaying graphics or video). The machine 300 can also include an alphanumeric input device 312 (e.g., a keyboard or keypad), a cursor control device 314 (e.g., a mouse, a touchpad, a trackball, a joystick, a motion sensor, an eye tracking device, or other pointing instrument), a storage unit 316, an audio generation device 318 (e.g., a sound card, an amplifier, a speaker, a headphone jack, any suitable combination thereof, or any other suitable signal generation device), and a network interface device 320.

The storage unit 316 includes the machine-storage medium 322 (e.g., a tangible and non-transitory machine-storage medium) on which are stored the instructions 324, embodying any one or more of the methodologies or functions described herein. The instructions 324 can also reside, completely or at least partially, within the main memory 304, within the processor 302 (e.g., within the processor's cache memory), or both, before or during execution thereof by the machine 300. Accordingly, the main memory 304 and the processor 302 can be considered machine-storage media (e.g., tangible, and non-transitory machine-storage media). The instructions 324 can be transmitted or received over the network 326 via the network interface device 320. For example, the network interface device 320 can communicate the instructions 324 using any one or more transfer protocols (e.g., Hypertext Transfer Protocol (HTTP)).

In some example embodiments, the machine 300 can be a portable computing device, such as a smart phone or tablet computer, and have one or more additional input components (e.g., sensors 328 or gauges). Examples of the additional input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components can be accessible and available for use by any of the modules described herein. The various memories (i.e., 304, 306, and/or memory of the processor(s) 302) and/or storage unit 316 can store one or more sets of instructions and data structures (e.g., software) 324 embodying or utilized by any one or more of the methodologies or functions described herein. These instructions, when executed by processor(s) 302 cause various operations to implement the disclosed embodiments.

As used herein, the terms "machine-storage medium," "device-storage medium," "computer-storage medium" (referred to collectively as "machine-storage medium 322") mean the same thing and can be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 322 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 322 specifically exclude carrier waves, modulated data signals, and other such media, at least some of which are covered under the term "signal medium" discussed below. In this context, the machine-storage medium is non-transitory. The term "signal medium" or "transmission medium" shall be taken to include any form of modulated data signal, carrier wave, and so forth. The term "modulated data signal" means a signal that has one or more of its characteristics set or changed in such a matter as to encode information in the signal. The terms "machine-readable medium," "computer-readable medium" and "device-readable medium" mean the same thing and can be used interchangeably in this disclosure. The terms are defined to include both machine-storage media and signal media. Thus, the terms include both storage devices/media and carrier waves/modulated data signals.

INDUSTRIAL APPLICABILITY

This document describes a technique for forecasting a projected replacement date of fluid filters, e.g., fuel filters, air filters, or oil filters, included as a part of an internal combustion engine of a work machine. In one approach to monitoring a condition of a fluid filter, an engine control module (ECM) of the internal combustion engine can be configured to selectively display an onboard diagnostic code related to a fluid filter. Here, the ECM can indicate that a filter should be checked or replaced when a precalculated future event of the onboard diagnostic code is reached. The precalculated future event can include the filter reaching a fixed number or an age of use, such as a number of engine running hours, number of engine starts, or a milestone, such as a number of miles traveled. Once the engine control module indicates that a fluid filter should be checked or replaced, the operator of the work machine will may generally contact a service provider to schedule a service. This service will may confirm the code displayed by the ECM and assess whether the fluid filter does indeed need to be replaced at the time of the service. A challenge with this approach is that such diagnostic codes can exhibit false inaccurate or irrelevant warnings, e.g., occurring at a frequency such that an operator may begin to ignore or delay in scheduling service with a service provider. Such inaccuracies can arise, since that where precalculated future events do not fail to account for significant variations in engine operating conditions, e.g., related to an ambient environment or task of a particular work machine.

The present inventors have recognized a need for an approach to a dynamic, continual assessment of a fluid filter over time, along with corresponding operating conditions, to provide a more meaningful and more definite alert to an operator or maintainer of the work machine to have the machine serviced.

Techniques described herein can enable greater accuracy in the estimation of fluid filter condition and lifetime, e.g., using work engine metric readings and comparing the rate of change with a configurable threshold. For example, sensor data corresponding with a particular fluid filter can be received by an algorithm in order to produce a normalized value, which can then be used to forecast a replacement date. In an example, the algorithm can incorporate at least one engine metric to help "screen out" any irrelevant engine transients, e.g., with the metric including a combination of the engine speed and the engine variance over a period, e.g., about 10 seconds. For operations related particularly to fuel filters, certain raw data can be received by the algorithm such as for projected forecasting. For operations related particularly to air filters, the algorithm can alternatively or additionally incorporate one or more extra data processing steps to help extract meaningful metrics before forecasting out and providing advanced warning. For example, air filter analysis can involve normalizing raw sensor data due to its dependency on how the engine is operated, and estimating a condition and lifetime of the air filter based on the normalized raw sensor data. The present approach can enable more pinpointed and accurate filter replacements, thereby avoiding over-maintenance, while preventing engine issues related to filter plugging or clogging.

In operation and use, the presently described internal combustion engine monitoring system can be used to monitor a fluid filter and project a time until the fluid filter should be replaced such as to avoid a plugging event. Herein, a plugging event can refer to a situation in which particles, debris, sludge, dirt, and other contaminants have built up in the fluid filter in such a manner as to restrict the fluid filter's ability to operate and/or allow sufficient fluid therethrough. This plugging event can increase the necessary fluid pressure required therethrough, or cap the maximum fluid pressure that is allowed therethrough. In either situation, it is possible that a fluid can be allowed through the fluid filter, but not in the requisite quantity or pressure as desired. Thus, the potentially negative effect that can be caused by such a plugging event can be avoided through monitoring and replacing the fluid filter before any such plugging event is allowed to occur.

Generally, the monitoring system described herein can facilitate detection of a deteriorating fluid filter condition in advance of an ECM diagnostic code alert. The monitoring system described herein can provide a reliable analysis of a fluid filter condition across a range of operating conditions (e.g., boost pressures ranging from about 20 kPa to over 100 kPa) and despite a variety of environmental conditions of a work machine. Such a reliable analysis can provide for improved timing of suggested fluid filter replacement as compared to scheduled replacement based on mileage, operation hours, or filter age which generally do not account for variations in engine operating conditions. In an example, the monitoring system can be used to receive data from a plurality of working machines, e.g., each corresponding with one or more fluid filters. For example, the monitoring system can be located remote from the plurality of working machines and can be coupled to the working machines through a communications interface (e.g., a transceiver over a network).

Figure 4:
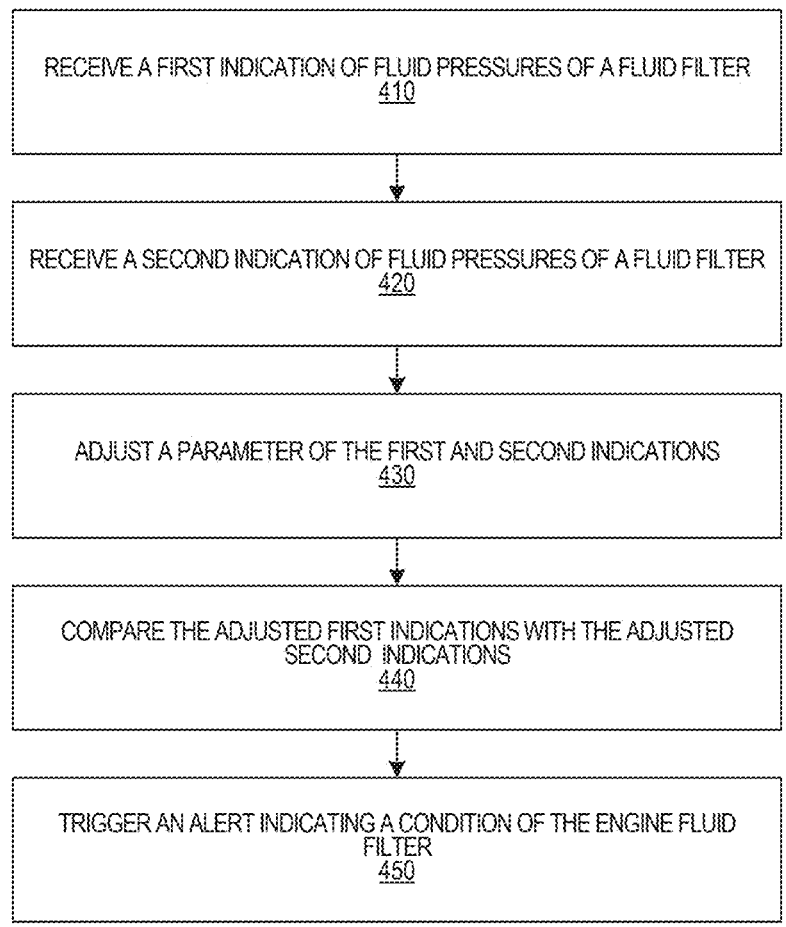
FIG. 4 is a diagram depicting a method for detecting a fluid filter condition of an internal combustion engine.

FIG. 4 is a flowchart that describes a method for detecting a fluid filter condition of an internal combustion engine. For example, the method can include monitoring a pressure differential over time across first and second sides of the fluid filter to estimate fluid flow across the fluid filter.

In an example, at 410, such monitoring can involve receiving a first indication of respective fluid pressures on first and second sides of the fluid filter at a first engine operating condition. Similarly, at 420, the method can include receiving a second indication of the respective fluid pressures on the first and second sides of the fluid filter at a second engine operating condition. For example, the first and second engine operating conditions respectively include first and second engine boost pressures. The first engine boost pressure can be within a range of 0 kilopascals (kPa) and 50 kPa and the second engine boost pressure can be greater than 100 kPa. In an example, the received first and second indications of respective fluid pressures can each include receiving a plurality of respective fluid pressure measurements on the first and second sides of the fluid filters over time. For example, the plurality of respective fluid pressure measurements can include more than 100 measurements taken per hour.

In an example, at 430, the method can include (e.g., in performing the smoothing operation 202 of FIG. 2) adjusting at least one parameter of the received first and second indications of respective fluid pressures to mitigate a difference attributable to a difference between the first and second engine operating conditions, such as a difference in engine boost pressure, mass fluid flow rate, the amount of mass fluid flow, or a combination thereof.

In an example, the method can include (e.g., in performing the normalization operation 204 of FIG. 2) receiving the adjusted first and second indications of respective fluid pressures and normalizing a range of values associated with the first and second indications. For example, method can determining a maximum peak value for at least one parameter of the adjusted first and second indications, which can then be normalized to within a predetermined range (e.g., between an upper limit and a lower limit).

At 440, the method can include (e.g., in performing the slope detection 206 of FIG. 2) comparing the adjusted first respective indications of the fluid pressures with the adjusted second respective indications of the fluid pressures. For example, the method can include calculating a slope based on the adjusted first respective indications of the fluid pressures with the adjusted second respective indications of fluid pressures. In an example, the method can include detecting a fluid pressure differential slope exceeding a threshold value. Also, the method can include (e.g., in performing the projection operation 208 of FIG. 2) estimating a period of time when the fluid pressure differential will exceed a threshold value.

At 450, the comparing can include (e.g., in performing the triggering operation 210 of FIG. 2) triggering an alert indicating a condition of the engine fluid filter based on the monitored pressure differential. For example, triggering the alert can include generating an indication to replace or clean the fluid filter based on the differential slope exceeding the threshold value. Triggering the alert can also include generating an indication to replace or clean the fluid filter in anticipation of a plugging event of the fluid filter.

Figure 5A:
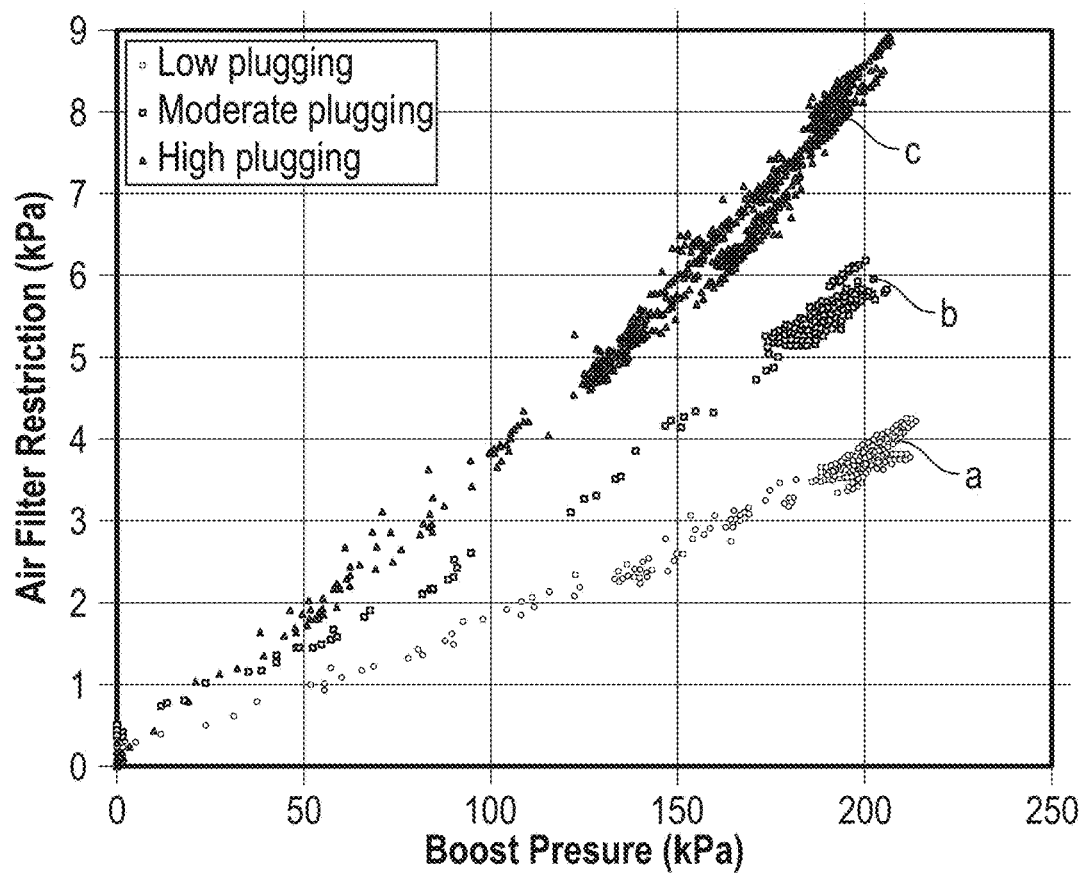
FIG. 5A is a plot depicting a measured air filter restriction as it relates to boost pressure.
Figure 5B:
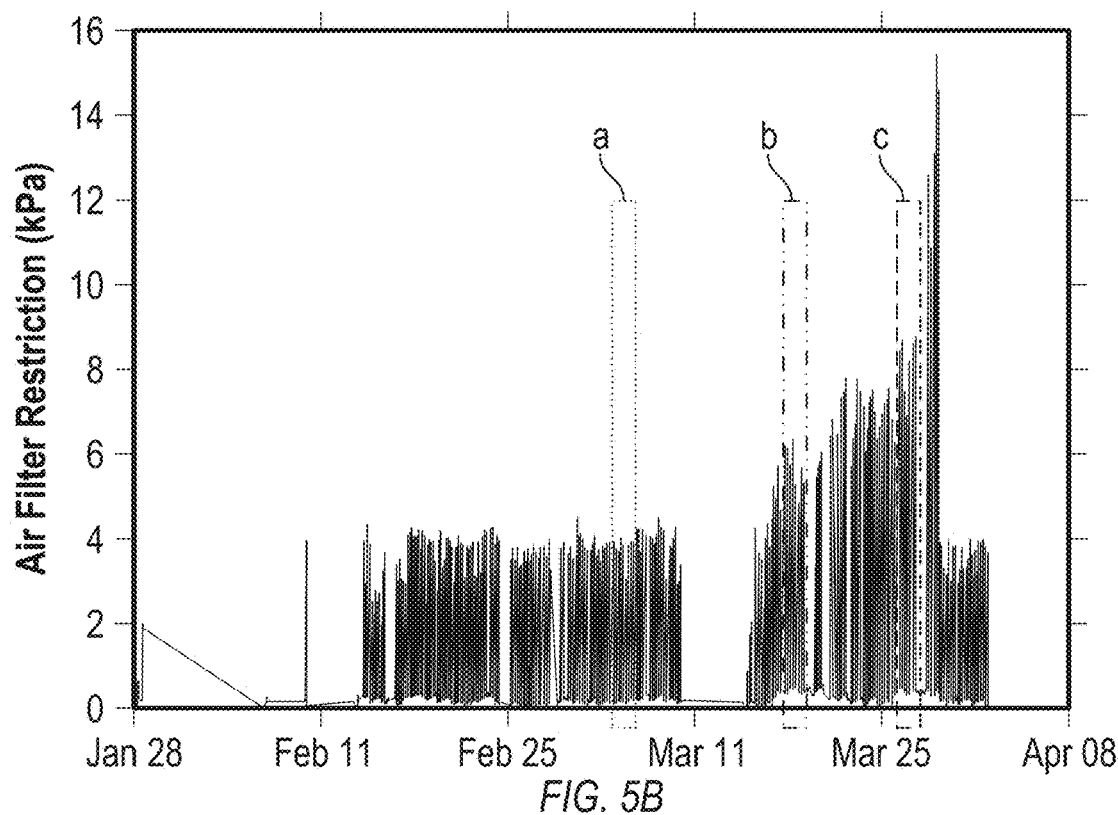
FIG. 5B is a plot depicting a measured air filter restriction as it relates to time.

FIG. 5A and FIG. 5B are plots depicting a measured air filter restriction as it relates to boost pressure and time, respectively. In an example, engine boost pressure of an internal combustion engine can be used, e.g., as a proxy for estimating airflow through an air filter. Here, a pressure differential across the air filter can be approximately proportional to a flow through the air filter. Generally, the internal combustion engine monitoring system described herein can track a slope over time and minimize certain effects of measuring air filter restriction at varying boost pressures. For example, FIG. 5A depicts varying slopes each corresponding with different time stages a, b, and c as indicated in FIG. 5B. By collecting data points across a range of boost pressures (e.g., a first "low" boost pressure between 0 and about 20 kPa and a second "high" boost pressure greater than about 120 kPa), statistically significant slopes can be calculated. As depicted, such slopes can increase over time as the filter ages.

Figure 6A:
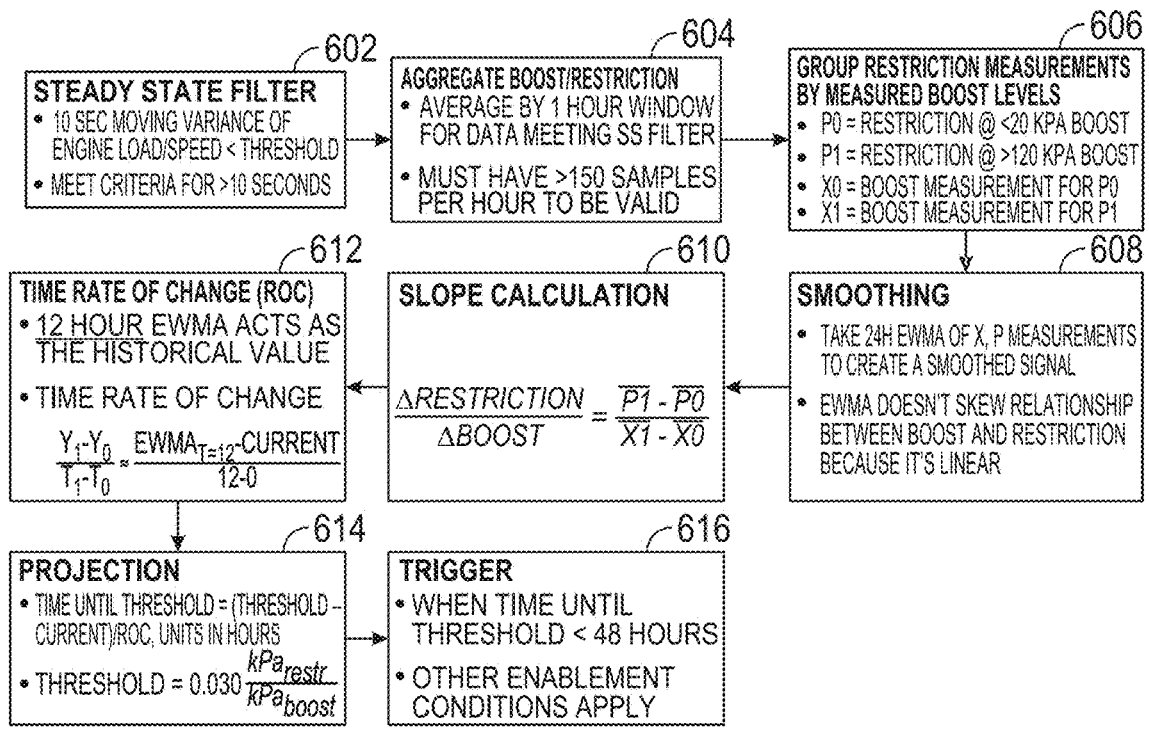
FIG. 6A is a diagram depicting operations for forecasting a projected replacement date of fluid filters.
Figure 6B:
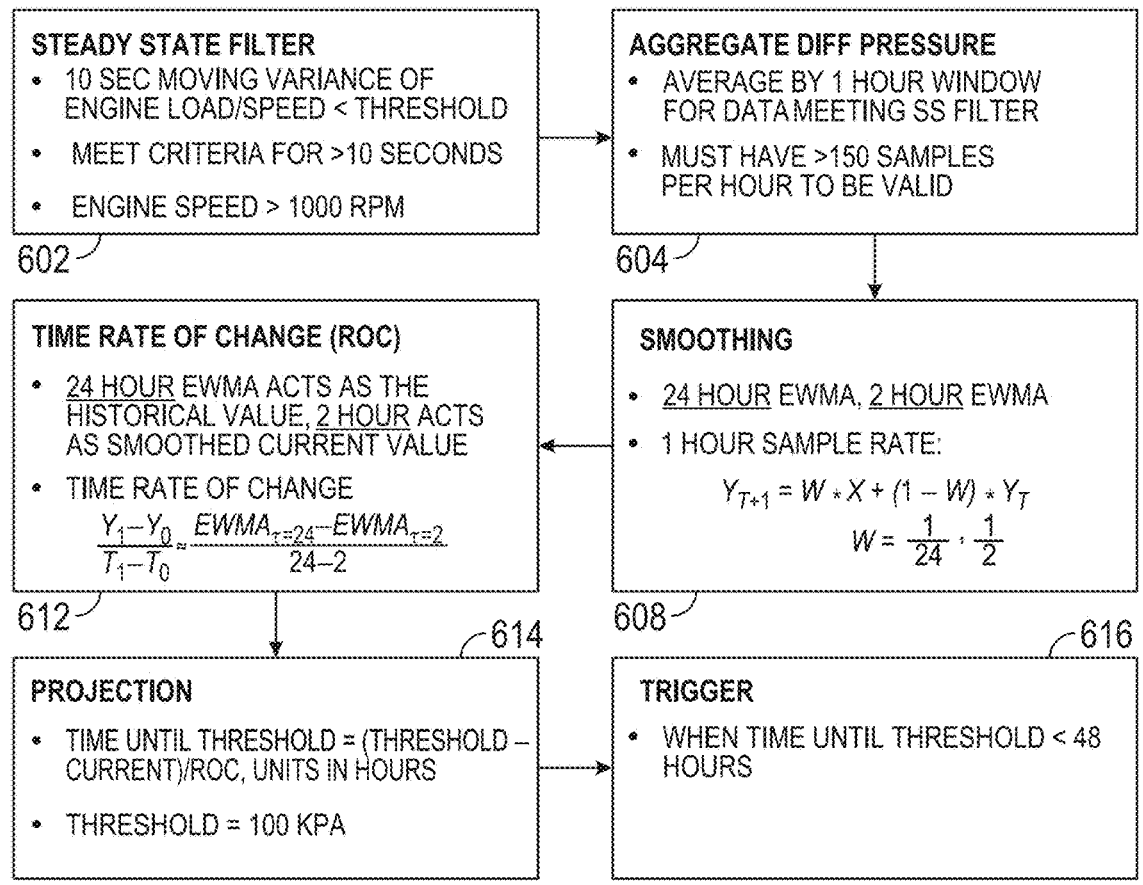
FIG. 6B is a diagram depicting operations for forecasting a projected replacement date of fluid filters.

FIG. 6A and FIG. 6B are diagrams depicting operations for forecasting a projected replacement date of fluid filters. At 602, a "steady state" of the fluid filter can be determined, e.g., by taking a moving variance of an engine load or speed being under a predetermined threshold. At 604, boost and restriction data or differential pressure data can be aggregated or filtered, e.g., involving greater than a threshold level of samples to be taken within a set time (e.g., >150 samples per hour). At 606, restriction measurements can be grouped, e.g., by measured boost levels. At 608, data can be smoothed, e.g., by taking an EWMA of certain data parameters. At 610, a slope can be calculated, e.g., of change in restriction over change in boost. At 612, a time ROC can be calculated, e.g., using the EWMA as a historical data point. At 614, a projection can be calculated for a time until the ROC will reach a predetermined threshold. At 616, a warning can be triggered, e.g., when a time until a threshold reaches less than a predetermined time frame (e.g., <48 hours).

Figure 7:
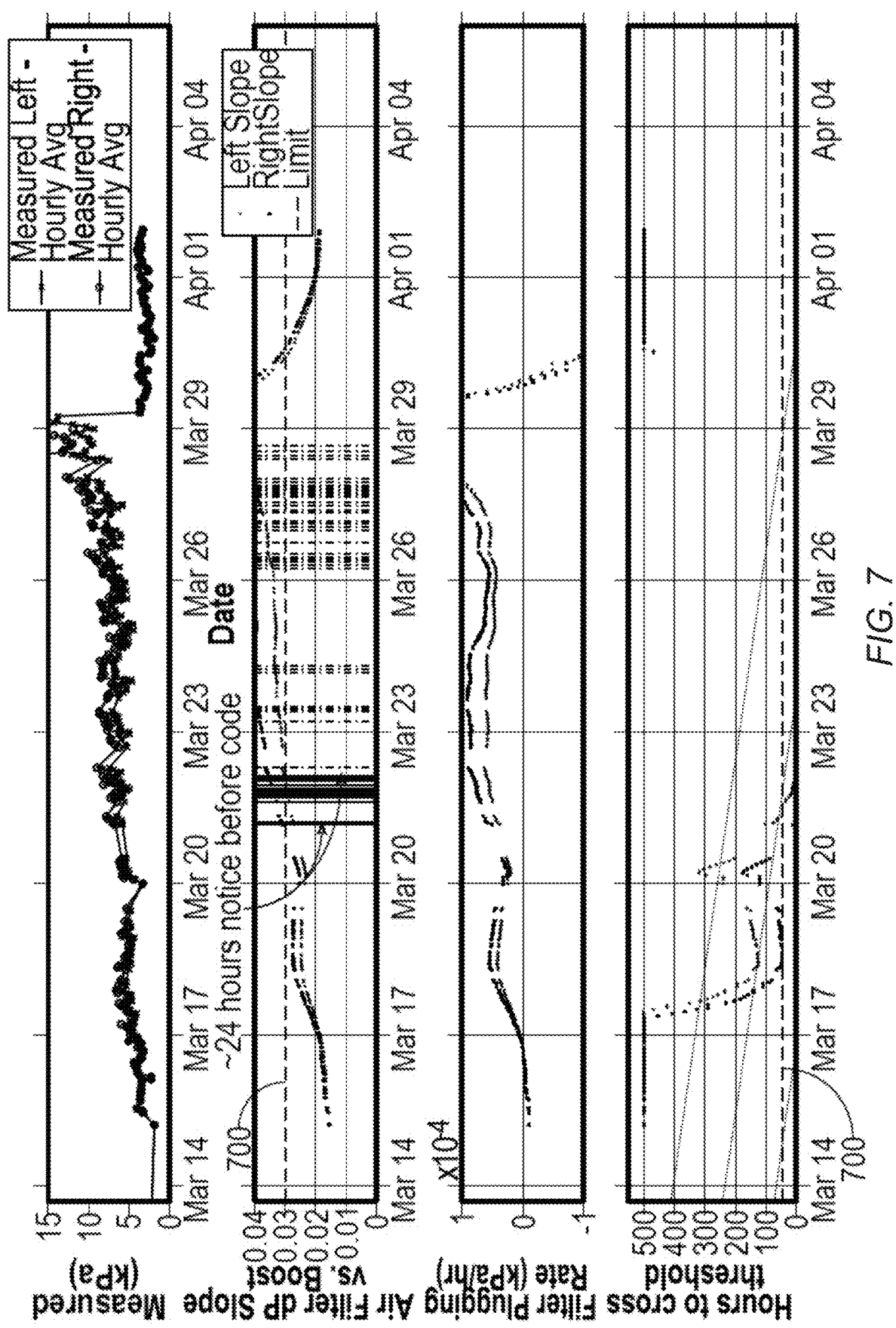
FIG. 7 includes plots of certain data parameters over time as they relate to plugging of a fluid filter.

FIG. 7 includes plots of certain data parameters over time as they relate to plugging of a fluid filter. As depicted in FIG. 7, the internal combustion engine monitoring system can monitor at least two similar fluid filters concurrently, e.g., a left and right air filter or a left and right fuel filter of an internal combustion engine. In an example, the dotted line 700 indicates when an ECM diagnostic code will be triggered. Based on performing operations described herein, the internal combustion engine monitoring system can predict when the ECM diagnostic code will be triggered and anticipate the code, e.g., greater than 24 hours before the ECM code is shown.

The above detailed description is intended to be illustrative, and not restrictive. The scope of the disclosure should, therefore, be determined with references to the appended claims, along with the full scope of equivalents to which such claims are entitled.

What is claimed is:

1. An internal combustion engine monitoring system, the system comprising:
   a fluid filter disposed between at least one fluid inlet of an internal combustion engine and at least one of a fluid source or an ambient fluid environment;
   a first fluid sensor arranged to receive a first indication of respective fluid pressures on first and second sides of the fluid filter at a first engine operating condition;
   a second fluid sensor arranged to receive a second indication of the respective fluid pressures on the first and second sides of the fluid filter at a second engine operating condition;
   processing circuitry configured to monitor a pressure differential over time across first and second sides of the fluid filter to estimate fluid flow across the fluid filter, the processing circuitry configured to:
   adjust at least one parameter of the received first and second indications of respective fluid pressures to mitigate a difference attributable to a difference between the first and second engine operating conditions; and
   compare the adjusted first respective indications of the fluid pressures with the adjusted second respective indications of the fluid pressures; and
   a user interface to generate an alert indicating a condition of the engine fluid filter based on the monitored pressure differential, the alert triggered by the processing circuitry based on the determined pressure differential exceeding a specified threshold differential.

2. The system of claim 1, wherein the first and second engine operating conditions respectively include first and second engine boost pressures.

3. The system of claim 2, wherein the first engine boost pressure is within a range of 0 kilopascals (kPa) and 50 kPa and the second engine boost pressure is greater than 100 kPa.

4. The system of claim 1, wherein the processing circuitry is configured to trigger the alert, including generating an indication to replace or clean the fluid filter based on a differential slope exceeding a specified threshold value.

5. The system of claim 1, wherein:
   the processing circuitry is configured to estimate a period of time when the fluid pressure differential will exceed a threshold value; and
   the user interface is configured to display the alert including an indication to replace or clean the fluid filter in anticipation of a plugging event of the fluid filter.

6. The system of claim 1, wherein the received first and second indications of respective fluid pressures each include a plurality of respective fluid pressure measurements on the first and second sides of the fluid filters over time.

7. The system of claim 6, wherein the plurality of respective fluid pressure measurements includes more than 100 measurements taken per hour.

8. The system of claim 7, wherein the processing circuitry is configured to normalize the plurality of respective fluid pressure measurements including calculating an exponentially weighted moving average (EWMA) of the plurality of respective pressure fluid measurements.

9. A method for detecting a fluid filter condition of an internal combustion engine, the method comprising:
monitoring a pressure differential over time across first and second sides of the fluid filter to estimate fluid flow across the fluid filter, comprising:
receiving a first indication of respective fluid pressures on first and second sides of the fluid filter at a first engine operating condition;
receiving a second indication of the respective fluid pressures on the first and second sides of the fluid filter at a second engine operating condition;
adjusting at least one parameter of the received first and second indications of respective fluid pressures to mitigate a difference attributable to a difference between the first and second engine operating conditions; and
comparing the adjusted first respective indications of the fluid pressures with the adjusted second respective indications of the fluid pressures; and
triggering an alert indicating a condition of the engine fluid filter based on the monitored pressure differential.

10. The method of claim 9, wherein the first and second engine operating conditions respectively include first and second engine boost pressures, wherein the first engine boost pressure is within a range of 0 kilopascals (kPa) and 50 kPa and the second engine boost pressure is greater than 100 kPa.

11. The method of claim 9, comprising:
detecting a fluid pressure differential slope exceeding a threshold value;
wherein triggering the alert includes generating an indication to replace or clean the fluid filter based on the differential slope exceeding the threshold value.

12. The method of claim 9, comprising:
estimating a period of time when the fluid pressure differential will exceed a threshold value;
wherein triggering the alert includes generating an indication to replace or clean the fluid filter in anticipation of a plugging event of the fluid filter.

13. The method of claim 9, wherein the received first and second indications of respective fluid pressures each include receiving a plurality of respective fluid pressure measurements on the first and second sides of the fluid filters over time.

14. The method of claim 13, wherein the plurality of respective fluid pressure measurements includes more than 100 measurements taken per hour.

15. The method of claim 14, wherein adjusting the received first and second indications of respective fluid pressures on the first and second sides of the fluid filter includes smoothing the plurality of respective fluid pressure measurements including calculating an exponentially weighted moving average (EWMA) of the plurality of respective pressure fluid measurements.

16. A computing device for detecting a fluid filter condition of an internal combustion engine, the computing device including a processor and a memory device, the memory device including instructions that, when executed by the processor, cause the computing device to:
monitor a pressure differential over time across first and second sides of the fluid filter to estimate fluid flow across the fluid filter, comprising:
receive a first indication of respective fluid pressures on first and second sides of the fluid filter at a first engine operating condition;
receive a second indication of the respective fluid pressures on the first and second sides of the fluid filter at a second engine operating condition;
adjust at least one parameter of the received first and second indications of respective fluid pressures to mitigate a difference attributable to a difference between the first and second engine operating conditions; and
compare the adjusted first respective indications of the fluid pressures with the adjusted second respective indications of the fluid pressures; and
trigger an alert indicating a condition of the engine fluid filter based on the monitored pressure differential.

17. The computing device of claim 16, wherein the first and second engine operating conditions respectively include first and second engine boost pressures, wherein the first engine boost pressure is within a range of 0 kilopascals (kPa) and 50 kPa and the second engine boost pressure is greater than 100 kPa.

18. The computing device of claim 16, wherein the memory device includes instructions that, when executed by the processor, cause the computing device to:
detect a fluid pressure differential slope exceeding a threshold value;
wherein triggering the alert includes generating an indication to replace or clean the fluid filter based on the differential slope exceeding the threshold value.

19. The computing device of claim 16, wherein the memory device includes instructions that, when executed by the processor, cause the computing device to:
estimate a period of time when the fluid pressure differential will exceed a threshold value;
wherein triggering the alert includes generating an indication to replace or clean the fluid filter in anticipation of a plugging event of the fluid filter.

20. The computing device of claim 16, wherein the received first and second indications of respective fluid pressures each include receiving a plurality of respective fluid pressure measurements on the first and second sides of the fluid filters over time.

\* \* \* \* \*